000

(12) United States Patent
Porte et al.

(10) Patent No.: US 10,676,203 B2
(45) Date of Patent: Jun. 9, 2020

(54) AIR INPUT STRUCTURE FOR AN AIRCRAFT NACELLE

(71) Applicants: Airbus Operations S.A.S., Toulouse (FR); AIRBUS SAS, Blagnac (FR)

(72) Inventors: Alain Porte, Colomiers (FR); Patrick Oberle, Verdun sur Garonne (FR); Gregory Albet, Grepiac (FR)

(73) Assignees: Airbus Operations S.A.S. (FR); AIRBUS SAS (FR)

( * ) Notice: Subject to any disclaimer, the term of this patent is extended or adjusted under 35 U.S.C. 154(b) by 250 days.

(21) Appl. No.: 15/834,605

(22) Filed: Dec. 7, 2017

(65) Prior Publication Data

US 2018/0170568 A1   Jun. 21, 2018

(30) Foreign Application Priority Data

Dec. 20, 2016   (FR) ...................................... 16 62817

(51) Int. Cl.
| | | |
|---|---|---|
| *B64D 33/02* | (2006.01) | |
| *B64F 5/40* | (2017.01) | |
| *F02C 7/04* | (2006.01) | |

(52) U.S. Cl.
CPC ................ *B64D 33/02* (2013.01); *B64F 5/40* (2017.01); *F02C 7/04* (2013.01); *F05D 2230/80* (2013.01); *Y02T 50/672* (2013.01)

(58) Field of Classification Search
CPC ........ B64D 29/06; B64D 29/08; B64D 33/02; F02C 7/04; B64C 7/02
See application file for complete search history.

(56) References Cited

U.S. PATENT DOCUMENTS

| | | | | |
|---|---|---|---|---|
| 6,328,258 B1 | 12/2001 | Porte | | |
| 6,837,459 B2* | 1/2005 | Gonidec | ................ | B64D 29/00 244/120 |
| 7,469,862 B2* | 12/2008 | Layland | ................ | B64D 15/12 244/134 D |
| 7,837,150 B2* | 11/2010 | Zecca | .................... | B64D 15/12 244/134 D |
| 7,923,668 B2* | 4/2011 | Layland | ................ | B64D 15/12 219/529 |
| 8,197,191 B2* | 6/2012 | Binks | .................... | B64D 29/08 415/119 |

(Continued)

FOREIGN PATENT DOCUMENTS

| | | |
|---|---|---|
| EP | 1 013 910 A1 | 6/2000 |
| EP | 2 194 233 A2 | 6/2010 |

(Continued)

OTHER PUBLICATIONS

FR 16 62817 Search Report dated Aug. 18, 2017.

*Primary Examiner* — Joseph W Sanderson
(74) *Attorney, Agent, or Firm* — Lerner, David, Littenberg, Krumholz & Mentlik, LLP

(57) ABSTRACT

An air input structure includes an air input lip and a front reinforcement frame placed inside the air input lip. The front part of the air input lip has a plurality of segments distributed angularly along the leading edge of the air input lip, two adjacent segments being separated by an intermediate part having an excess thickness. Each segment has four edges, each having an excess thickness relative to the rest of the segment.

6 Claims, 5 Drawing Sheets

(56) References Cited

U.S. PATENT DOCUMENTS

| | | | | |
|---|---|---|---|---|
| 8,240,982 B2* | 8/2012 | Vauchel | ............... | B64D 15/12 415/119 |
| 8,438,828 B2 | 5/2013 | Lenk | | |
| 8,939,713 B2* | 1/2015 | Blin | ............... | B64D 29/00 415/119 |
| 9,663,238 B2* | 5/2017 | Kane | ............... | B64D 33/02 |
| 9,664,113 B2* | 5/2017 | Wilson | ............... | B64D 29/06 |
| 9,845,728 B2* | 12/2017 | Brown | ............... | F02C 7/04 |
| 2004/0000615 A1* | 1/2004 | Gonidec | ............... | B64D 29/00 244/53 B |
| 2006/0237582 A1* | 10/2006 | Layland | ............... | B64D 15/12 244/53 R |
| 2008/0179448 A1* | 7/2008 | Layland | ............... | B64D 15/12 244/1 N |
| 2010/0038475 A1* | 2/2010 | Zecca | ............... | B64D 15/12 244/1 N |
| 2010/0139241 A1* | 6/2010 | Lenk | ............... | F01D 9/04 60/226.1 |
| 2011/0120076 A1 | 5/2011 | Vauchel | | |
| 2012/0312924 A1* | 12/2012 | Rainous | ............... | B64D 15/00 244/134 E |
| 2013/0266448 A1* | 10/2013 | Blin | ............... | B64D 29/00 416/219 R |
| 2015/0129045 A1* | 5/2015 | Kane | ............... | B64D 33/02 137/15.1 |
| 2015/0260104 A1* | 9/2015 | Wilson | ............... | B64D 29/06 60/796 |
| 2016/0257418 A1 | 9/2016 | Caruel | | |
| 2017/0107905 A1* | 4/2017 | Brown | ............... | F02C 7/04 |
| 2018/0201387 A1* | 7/2018 | Porte | ............... | F02C 7/045 |
| 2019/0093557 A1* | 3/2019 | Thomas | ............... | F02C 7/045 |

FOREIGN PATENT DOCUMENTS

| | | |
|---|---|---|
| EP | 2 918 499 A1 | 9/2015 |
| FR | 2 898 868 A1 | 9/2007 |
| WO | 2015/071609 A1 | 5/2015 |

* cited by examiner

AIR INPUT STRUCTURE FOR AN AIRCRAFT NACELLE

FIELD OF THE INVENTION

The present invention relates to an air input structure for an aircraft nacelle, an aircraft nacelle comprising such an air input structure, an aircraft comprising at least one such nacelle, and a method for repairing such an air input structure.

BACKGROUND OF THE INVENTION

An aircraft engine comprises a nacelle in which the engine itself is housed. The nacelle, which takes an annular form, has, at the front, an air input structure.

By convention, the terms "front" and "rear" are used throughout the text by taking the front and the rear of the engine as reference.

The air input structure globally comprises an internal face and an external face in contact with the outside air, while the internal face delimits a jet which constitutes the fan case ducting.

The function of the air input structure is, in particular, to ensure the aerodynamic flow of the air, on the one hand, to the fan case ducting, and, on the other hand, to the outside of the nacelle.

The air input structure comprises an air input lip, a front reinforcement frame, an acoustic panel and an external panel.

The air input lip has a U-shaped section open to the rear. It forms the outer jacket of the front part of the air input structure and it ensures the distribution of the air between the part which penetrates into the fan case ducting and the part which flows around the nacelle.

The external panel extends the air input lip on the external side and constitutes a part of the external face.

The front reinforcement frame also has a U-shaped section open to the rear and it is placed inside and to the rear of the air input lip. The front reinforcement frame ensures the mechanical strength of the front part of the nacelle and assists in preserving the shape and the dimensioning thereof.

The acoustic panel forms the internal jacket of the nacelle, behind the air input lip, on the side of the fan case ducting. The acoustic panel therefore constitutes a part of the internal face. The acoustic panel has a structure designed to attenuate the noises and is of composite sandwich type.

It may be that the air input lip is subjected to impacts that can damage it.

Repairing the air input lip then consists in cutting the part of the air input lip which is around the damaged zone, in conforming a plate for it to take the form of the cut part, then in fixing the plate using splices.

The splices are placed inside the air input lip straddling the conformed plate and the skin of the air input lip remaining in place. Each splice is then fixed by screwing or riveting from the outside.

To ensure that the screw or rivet heads are flush with the outer surface of the skin of the air input lip, it is necessary to produce a countersinking in the skin of the air input lip from the outside. The depth of the countersinking is conventionally of the order of 1.3 mm and the thickness of the skin of the air input lip must therefore be greater and is conventionally between 1.6 mm and 2 mm.

Although such a repair procedure gives satisfactory results, it is necessary to provide a relatively great skin thickness all along the leading edge of the air input lip, which is detrimental from the point of view of weight and therefore of fuel consumption.

BRIEF SUMMARY OF THE INVENTION

An aspect of the present invention may propose an air input structure which makes it possible to have a reduced skin thickness while simplifying the repairs.

An air input structure is proposed for an aircraft nacelle, said air input structure comprising:
  an air input lip with U-shaped section open to the rear and ensuring the distribution of the air between an internal face and an external face,
  a front reinforcement frame placed inside the air input lip and secured to the air input lip in an internal junction zone on the side of the internal face and an external junction zone on the side of the external face,
  the front part of the air input lip having a plurality of segments distributed angularly along the leading edge of the air input lip, two adjacent segments being separated by an intermediate part having an excess thickness,
  each segment having a first edge, a second edge, an internal edge and an external edge, each edge of each segment having an excess thickness relative to the rest of the segment,
  the air input lip having, between the internal junction zone and the excess thickness of the internal edge, an internal excess thickness, between the external junction zone and the excess thickness of said external edge, an external excess thickness,
  the excess thickness of the internal edge extending the internal excess thickness, the excess thickness of the external edge extending the external excess thickness, the excess thickness of the first edge extending the excess thickness of the intermediate part in contact, and the excess thickness of the second edge extending the excess thickness of the intermediate part in contact,
  the excess thicknesses that are extending one another being of a single piece and of a single material and forming a single excess thickness.

Thus, the air input lip has a lighter structure.

Advantageously, for each segment, the air input structure comprises a predefined cutting line, identifiable from the outside and running in the middle of each of said single excess thicknesses.

The invention also proposes a nacelle for an aircraft engine, said nacelle having an air input structure according to one of the preceding variants.

The invention also proposes an aircraft comprising at least one nacelle according to the preceding variant.

The invention also proposes a method for repairing an air input structure according to a preceding variant, said repair method comprising:
  a cutting step during which an affected segment is cut along the cutting line,
  a placement step during which a replacement segment identical to the cut segment is fitted in place of the cut segment, and
  a fixing step during which the replacement segment is fixed by splices fixed by screwing or riveting from the outside on the excess thicknesses.

Advantageously, the placement step comprises:
  a prepositioning substep during which a template having the traces of the holes to be produced is placed around the replacement segment and the air input lip,
  a drilling substep during which holes are drilled at the appropriate points defined by the template, and a placement substep during which screws or rivets are placed in the holes thus produced.

BRIEF DESCRIPTION OF THE DRAWINGS

The features of the invention mentioned above, and others, will become more clearly apparent on reading the following description of an exemplary embodiment, said description being given in relation to the attached drawings, in which.

DETAILED DESCRIPTION

Figure 1:
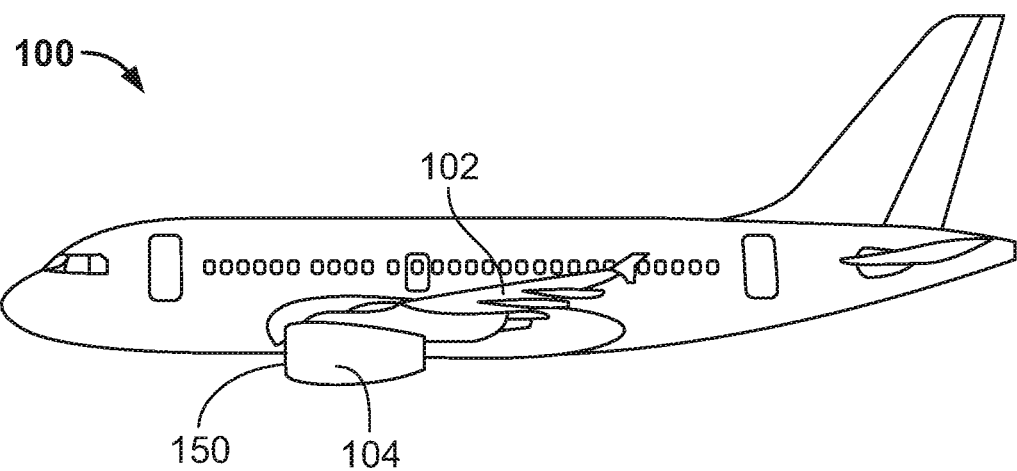
FIG. 1 is a side view of an aircraft having an air input structure according to the invention.

FIG. 1 shows an aircraft 100 which has a wing 102 and, under the wing 102, a nacelle 104 according to an embodiment of the invention in which an engine is housed.

The front of the nacelle 104 has an air input structure 150 according to an embodiment of the invention.

Figure 2:
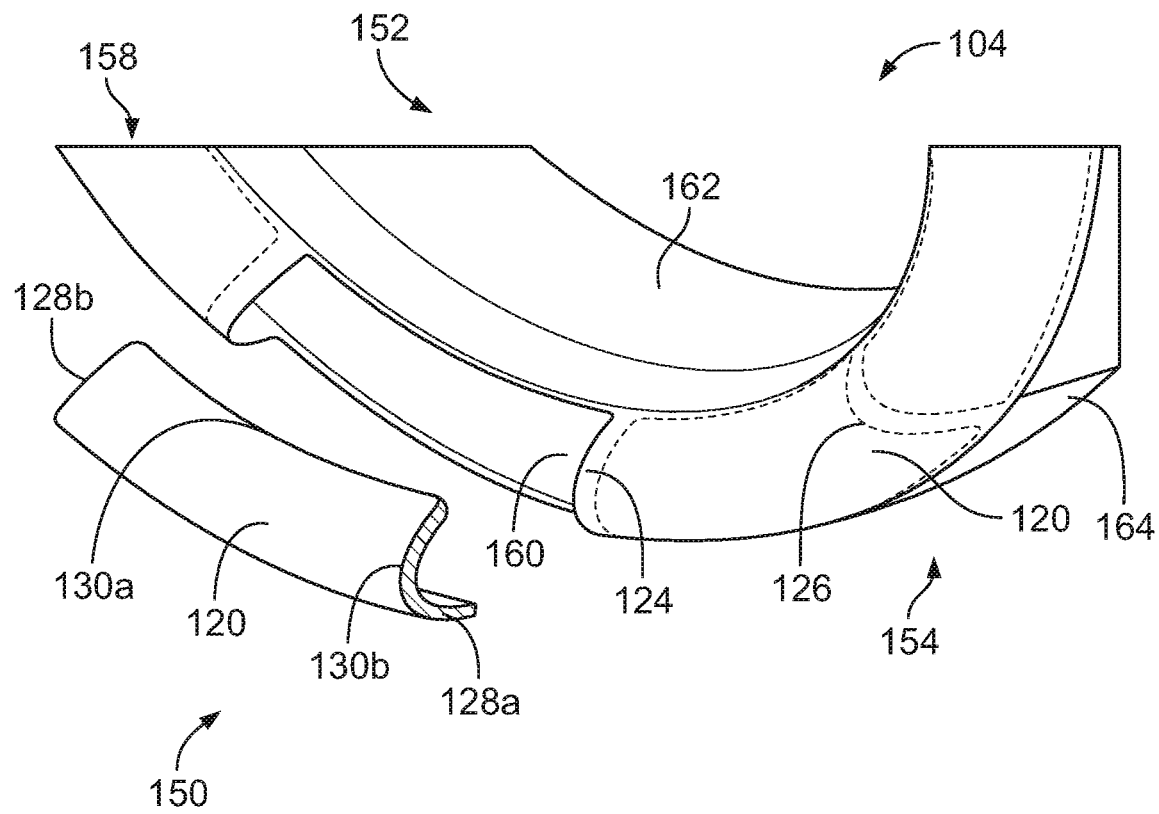
FIG. 2 is a perspective view of an air input structure being repaired.
Figure 2A:
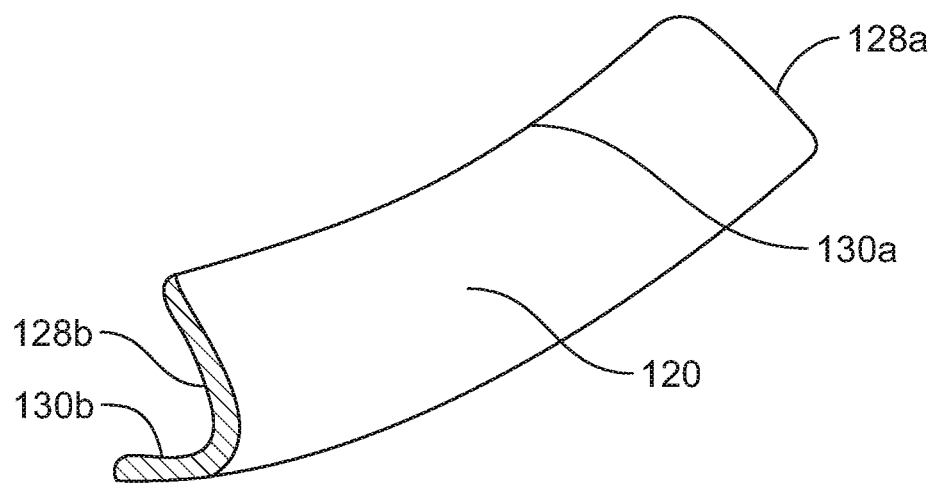
Figure 2B:
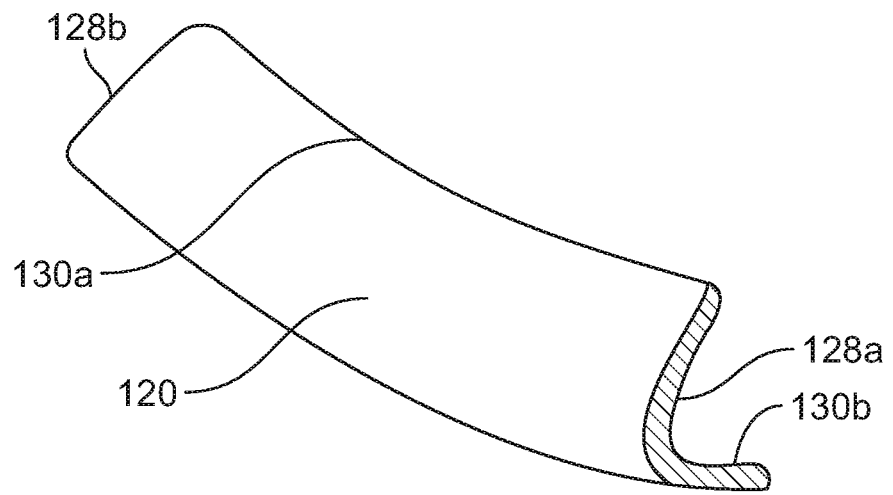

FIG. 2 shows the nacelle 104 seen from in front. The nacelle 104 has an annular shape and the air input structure 150 comprises an internal face 152 and an external face 154 in contact with the outside air, while the internal face 152 delimits a jet which constitutes the fan case ducting in which a fan is housed.

Figure 3:
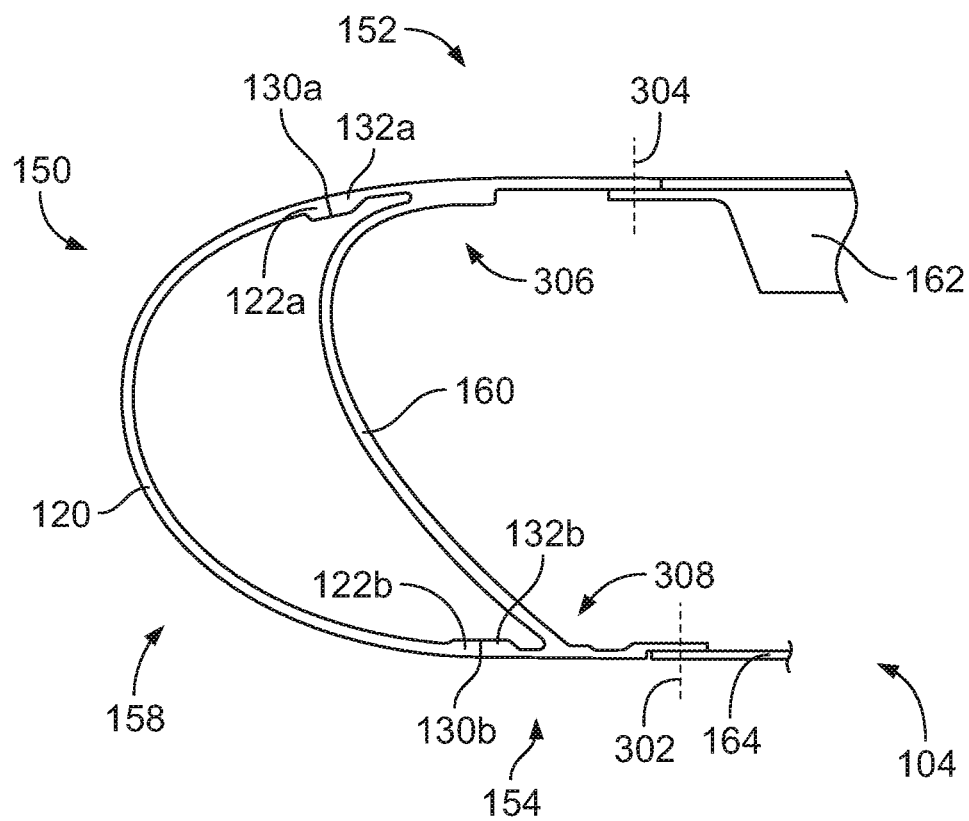
FIGS. 3 to 5 show side and cross-sectional views of an air input structure according to the invention during different repair steps.

FIG. 3 shows a cross section of the air input structure 150.

The air input structure 150 comprises, among other things, an air input lip 158, an acoustic panel 162, a front reinforcement frame 160 and an external panel 164.

The air input lip 158 has a U-shaped section open to the rear, forms the outer jacket of the front part of the air input structure 150 and ensures the distribution of the air between the internal face 152 and the external face 154.

The external panel 164 extends the air input lip 158 to the rear on the side of the external face 154 and thus constitutes a part of the external face 154. The external panel 164 is fixed to the air input lip 158 via rivets symbolized by a chain dotted line 302.

The acoustic panel 162 extends the air input lip 158 to the rear on the side of the internal face 152, that is to say on the side of the fan case ducting 156, and thus constitutes a part of the internal face 152. The acoustic panel 162 is fixed to the air input lip 158 via rivets symbolized by a chain dotted line 304.

The front reinforcement frame 160 has a U-shaped section open to the rear and it is placed inside and secured to the air input lip 158. The front reinforcement frame 160 ensures the mechanical strength of the front part of the nacelle 104 and assists in preserving the shape and the dimensioning thereof.

In the embodiment of the invention presented here, the front reinforcement frame 160 is of a single piece with the air input lip 158, but it could constitute a separate element fixed inside the air input lip 158 via rivets.

The front reinforcement frame 160 is secured to the air input lip 158 in an internal junction zone 306 on the side of the internal face 152 and in an external junction zone 308 on the side of the external face 154.

The front part of the air input lip 158, that is to say that which is in front of the front reinforcement frame 160, has a plurality of segments 120 which are distributed angularly along the leading edge of the air input lip 158.

Each segment 120 is represented by a line, here a chain dotted line, which represents a cutting line 126 of the segment 120 that is predefined and identifiable from the outside. The cutting line 126 is said to be predefined when it is already drawn.

Two adjacent segments 120 are separated by an intermediate part 124 which has a U-shaped section open to the rear.

Each segment 120 also has a U-shaped section open to the rear.

Each segment 120 thus has four edges, namely:
a first edge 128*a*,
a second edge 128*b*,
an internal edge 130*a* and
an external edge 130*b*.

The first and the second edges 128*a-b* take the form of a U open to the rear, and the internal edge 130*a* and the external edge 130*b* overall take the form of a circular arc.

Each edge 128*a-b*, 130*a-b* of each segment 120 has an excess thickness 122*a-b* relative to the rest of the segment 120, that is to say that the rest of the segment 120, between the excess thicknesses 122*a-b*, has a reduced thickness relative to the excess thicknesses 122*a-b*.

The air input lip 158 has, between the internal junction zone 306 and the internal edge 130*a*, and more specifically the excess thickness 122*a* of said internal edge 130*a*, an internal excess thickness 132*a*.

The air input lip 158 has, between the external junction zone 308 and the external edge 130*b*, and more specifically the excess thickness 122*b* of said external edge 130*b*, an external excess thickness 132*b*.

Each intermediate part 124 also has an excess thickness.

Thus, when the segment 120 is in position, the excess thickness 122*a* of the internal edge 130*a* extends the internal excess thickness 132*a*, the excess thickness 122*b* of the external edge 130*b* extends the external excess thickness 132*b*, the excess thickness of the first edge 128*a* extends the excess thickness of the intermediate part 124 in contact, and the excess thickness of the second edge 128*b* extends the excess thickness of the intermediate part 124 in contact.

When manufacturing the air input lip 158, the excess thicknesses which extend one another are of a single piece and of a single material and form a single excess thickness, and the cutting line 126 runs in the middle of this single excess thickness.

The reduced thickness is, for example, of the order of 1 mm, whereas the excess thicknesses 122*a-b*, 132*a-b* are for example of the order of 1.6 mm to 2 mm.

Thus, the air input lip 158 has a lighter structure than in the case of the prior art, since only the excess thicknesses are thickened.

Figure 4:
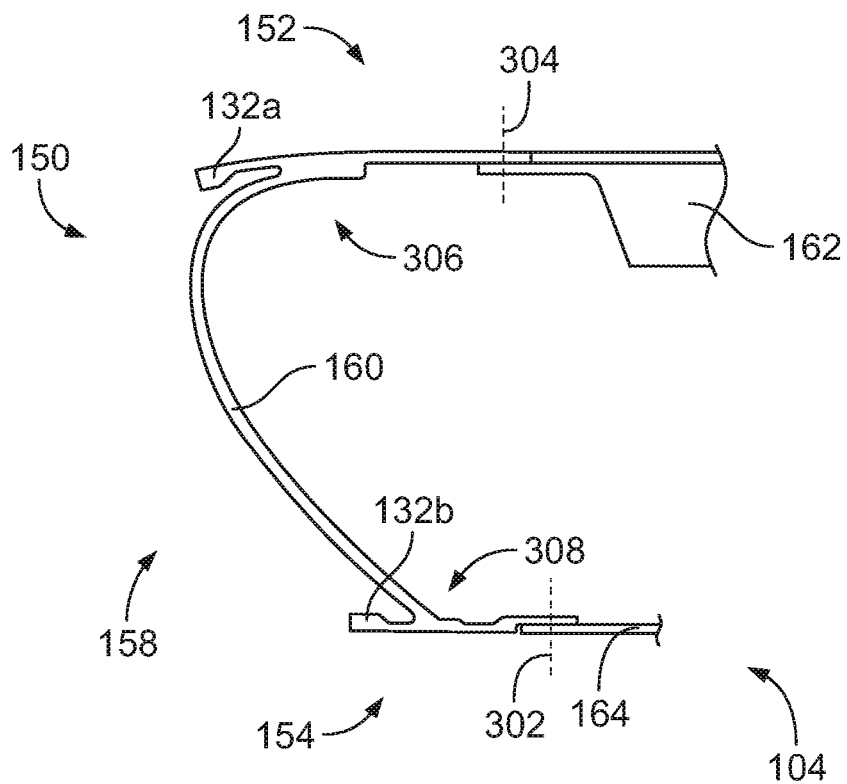

In case of the presence of an impact on a segment 120, it is then easy to cut the affected segment by following the cutting line 126, by separating the excess thicknesses which extend one another. FIG. 4 shows the air input lip 158 for which a segment 120 has been cut. The cutting is done for example by positioning a predefined trimming tool using existing fixing holes outside of the impact zone.

Obviously, depending on the size of the impact, it is possible for several consecutive segments 120 to be affected. In this case, all of the segments 120 which are affected are cut by following the cutting lines 126, and the intermediate parts 124 which are also affected are also cut by extending the cutting lines 126.

Figure 5:
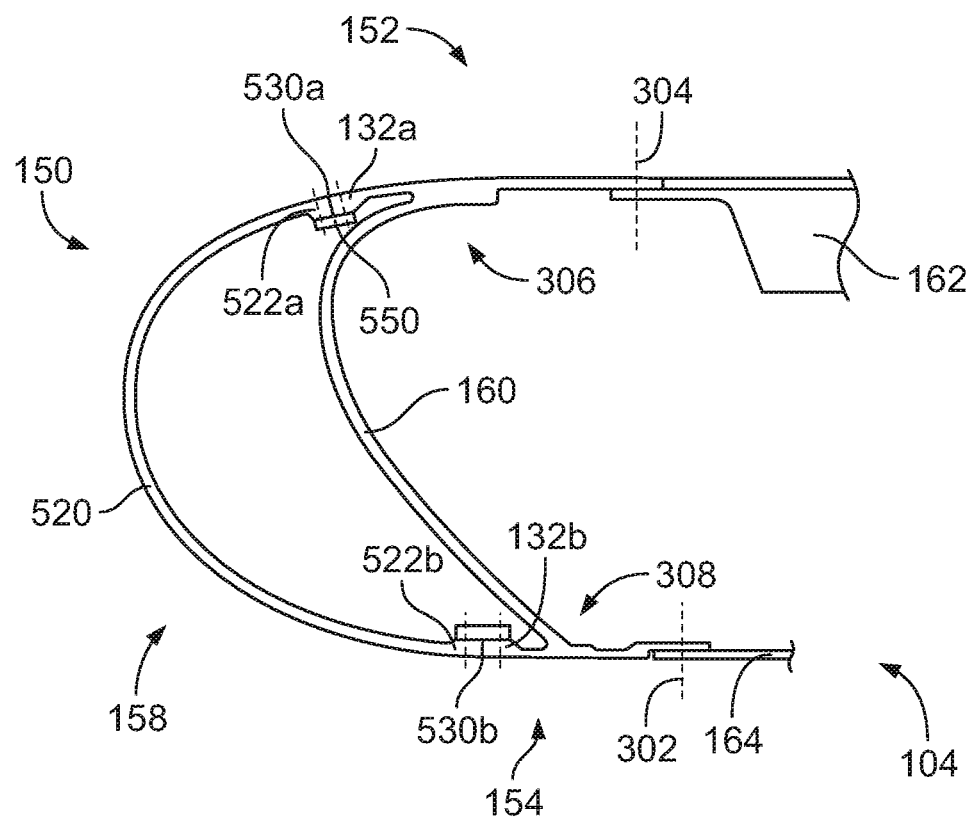

FIG. 5 shows the air input lip 158 for which a replacement segment 520 has been put in place to replace the cut segment 120.

The replacement segment 520 takes the same shape as the cut segment 120 and also has a first edge, a second edge, an internal edge 530a and an external edge 530b, and each edge 130a-b has an excess thickness 522a-b relative to the rest of the replacement segment 520.

When the replacement segment 520 is put in place, the excess thickness 522a of the internal edge 530a extends the internal excess thickness 132a, the excess thickness 522b of the external edge 530b extends the external excess thickness 132b, the excess thickness of the first edge extends the excess thickness of the intermediate part 124 in contact, and the excess thickness of the second edge extends the excess thickness of the intermediate part 124 in contact.

The replacement segment 520 is then fixed by splices 550 positioned inside the air input lip 158 and fixed by screwing or riveting from the outside on the excess thicknesses thus placed in the extension of one another.

The presence of the excess thicknesses allows for the production of countersinking from the outside in order to conceal the screw or rivet heads.

Figure 6:
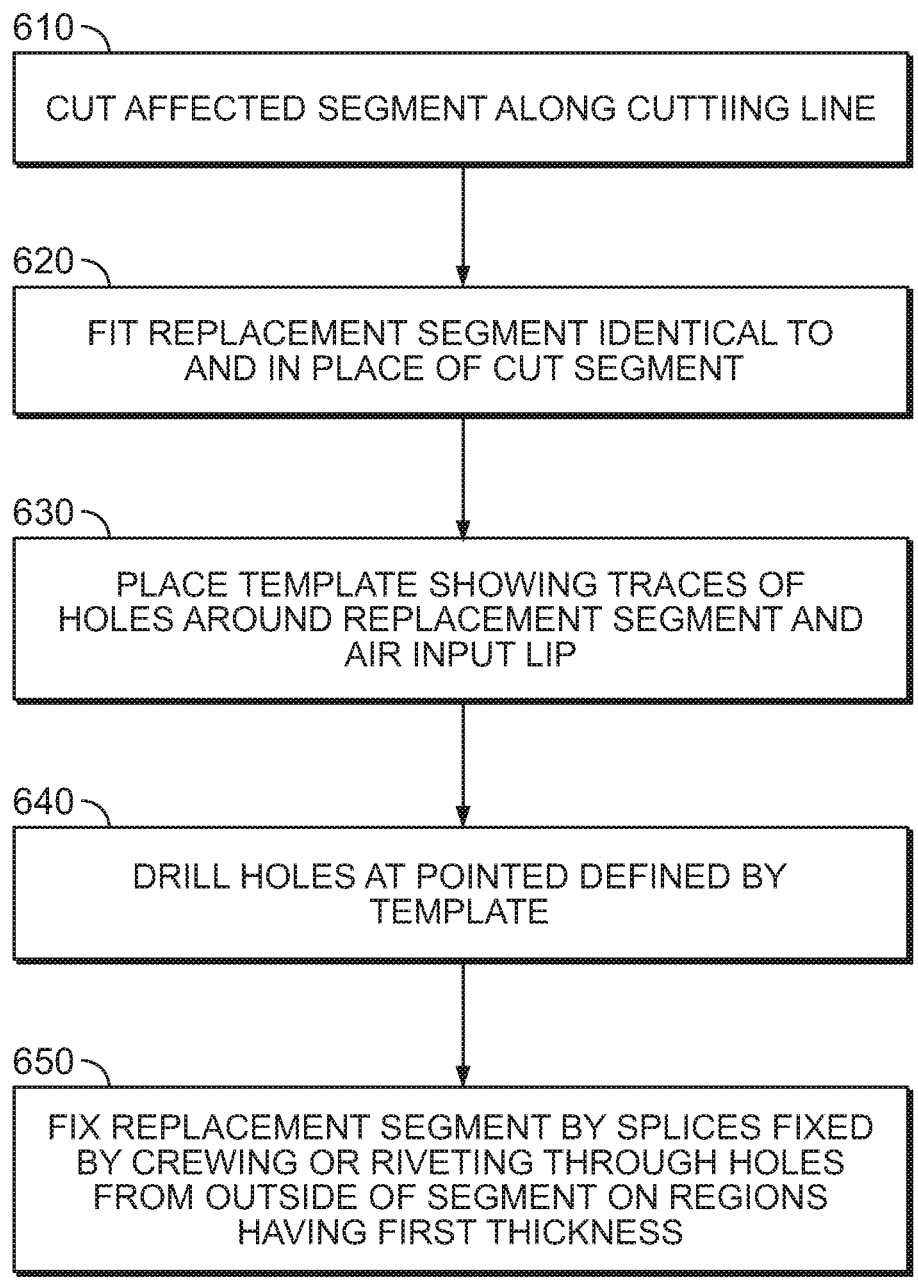
FIG. 6 illustrates a flow chart for a method for repairing an air input structure, according to an aspect of the invention.

A method, illustrated in FIG. 6, for repairing the air input structure 150 thus consists of:
- a cutting step 610 during which an affected segment 120 is cut along the cutting line 126,
- a placement step 620 during which a replacement segment 520 identical to the cut segment 120 is fitted in place of the cut segment 120, and
- a fixing step 650 during which the replacement segment 520 is fixed by splices 550 fixed by screwing or riveting from the outside on the excess thicknesses.

As mentioned above, when several adjacent segments 120 are affected, the cutting step consists also in cutting the intermediate parts 124 between said segments 120, and the placement step consists in repositioning a replacement segment which is identical to the assembly consisting of said cut segments 120 with the cut intermediate parts 124.

The advantage of such an architecture is being able to prepare, for each segment 120 or several segments 120 inclusive, the intermediate parts 124, a spare part of preprogrammed shapes, in order to cover all the possible repair cases over all of the surface of the lips. This avoids having to conform a plate as described in the prior art, having to define and validate, on a per-case basis, designs for repairs and of sizes that are not known in advance. The external appearance of the air input lip 158 thus repaired is then dependent on the size of the impact, very close or identical to that of the new air input lip 158.

The placement step comprises a prepositioning substep, a drilling substep and a substep of placement of the screws or rivets.

The prepositioning substep 630 consists in placing, around the replacement segment 520 and the air input lip 158, a template having traces of the holes to be produced. The template for example takes the form of a flexible sheet, of transfer type, on which the positions of the holes to be drilled are marked.

The drilling substep 640 consists in drilling the holes at the appropriate points defined by the template. The drilling substep is performed, for example, by positioning a predefined drilling tool, using existing fixing holes outside of the impact zone.

The placement substep consists in placing the screws or the rivets in the holes thus produced.

Each segment 120 extends between 10° and 30° around the axis of the nacelle 104, i.e. between 12 and 36 segments 120 per air inlet, whereas each intermediate part 124 extends between 0 and 2° around the axis of the nacelle 104.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air input structure for a nacelle of an aircraft, said air input structure comprising:
    an air input lip with U-shaped section open to the rear and ensuring the distribution of the air between an internal face and an external face; and
    a front reinforcement frame placed inside the air input lip and secured to the air input lip in an internal junction zone on the side of the internal face and an external junction zone on the side of the external face, the front part of the air input lip having a plurality of segments distributed angularly along the leading edge of the air input lip, two adjacent segments being separated by an intermediate part having a first thickness, each segment having a first edge, a second edge, an internal edge and an external edge, at least the internal edge and the external edge of each segment having a thickness equal to the first thickness and rest of the segment having a second thickness smaller than the first thickness,
    the air input lip having, between the internal junction zone and the first thickness of the internal edge, an internal portion having a thickness equal to the first thickness, and between the external junction zone and the first thickness of said external edge, an external portion having a thickness equal to the first thickness,
    wherein the internal edge and the external edge are unitary with the rest of the segment, and are made of a same material as that of the rest of the segment.

2. The air input structure according to claim 1, wherein, each segment comprises a predefined cutting line, identifiable from outside of the segment and running in the middle of each of regions of at least the internal edge and the external edge having first thickness.

3. A nacelle for an aircraft engine, said nacelle having an air input structure according to claim 1.

4. An aircraft comprising at least one nacelle according to claim 3.

5. A method for repairing an air input structure according to claim 2, said repair method comprising:
    a cutting step during which an affected segment is cut along the cutting line,
    a placement step during which a replacement segment identical to the cut segment is fitted in place of the cut segment, and a fixing step during which the replacement segment is fixed by splices fixed by screwing or riveting from the outside of the segment on the regions having first thickness.

6. The repair method according to claim 5, wherein the placement step comprises:
a prepositioning substep during which a template showing traces of holes to be produced is placed around the replacement segment and the air input lip,
a drilling substep during which holes are drilled at the appropriate points defined by the template, and
a placement substep during which screws or rivets are placed in the holes thus produced.

* * * * *